United States Patent [19]
Hayakawa et al.

[11] Patent Number: 5,181,150
[45] Date of Patent: Jan. 19, 1993

[54] DUAL MAGNETIC HEAD FOR READING AND WRITING INFORMATION AT HIGH AND LOW TRACK DENSITY INCLUDING ERASE GAPS HAVING AN UNDULATING SHAPE

[75] Inventors: Yuichi Hayakawa; Takeshige Iwakura; Hiroshi Tsutsui, all of Tokyo; Atsushi Hirano; Makoto Miyazaki, both of Gunma, all of Japan

[73] Assignee: NEC Corp., Tokyo, Japan

[21] Appl. No.: 677,196

[22] Filed: Mar. 29, 1991

[30] Foreign Application Priority Data

Mar. 29, 1990 [JP] Japan .................. 2-82792
Mar. 29, 1990 [JP] Japan .................. 2-82793

[51] Int. Cl.⁵ .......................... G11B 5/265; G11B 5/10
[52] U.S. Cl. .............................. 360/121; 360/118; 360/128
[58] Field of Search ................ 360/121, 118, 128, 119

[56] References Cited

U.S. PATENT DOCUMENTS

5,027,244 6/1991 Hayakawa .................. 360/121
5,041,936 8/1991 Hayakawa .................. 360/121

Primary Examiner—Robert S. Tupper
Attorney, Agent, or Firm—Sughrue, Mion, ZInn Macpeak & Seas

[57] ABSTRACT

A dual magnetic head capable of reducing unneccessary magnetic flux developed in erase cores. The dual magnetic head includes a first read/write core (30) having a first gap width (34) and extending in a track direction in which the tracks will be formed on a magnetic recording medium, a second read/write core (10) having a second read/write gap (14) with a width greater than the first gap width, and juxtaposed to the first read/write core (30) in a perpendicular direction to the track direction; and an erase core (20) having a pair of erase gaps (24, 25) located at opposite ends of the second read/write gap (14) with respect to the perpendicular direction, the erase core (20) being juxtaposed to the first read/write core (30) in the perpendicular direction and juxtaposed to the second read/write core (10) in the track direction, at least one of the facing surfaces of the erase core (20) which define the erase gaps (24, 25) therebetween being provided with an undulation. The undulation can be in the form of either a saw-tooth-like section or a waveform-like section.

21 Claims, 5 Drawing Sheets

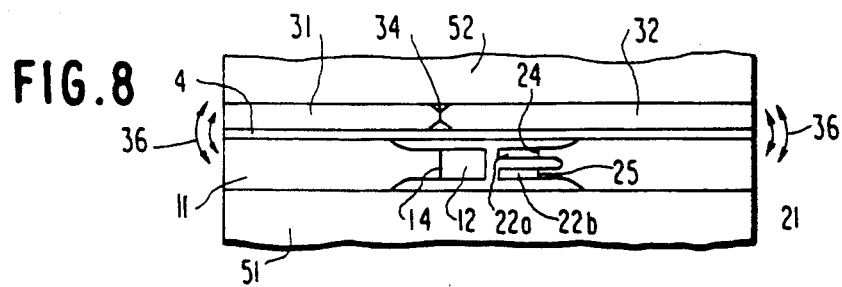
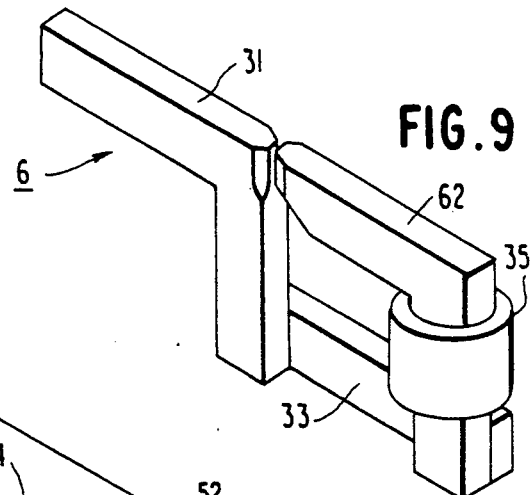
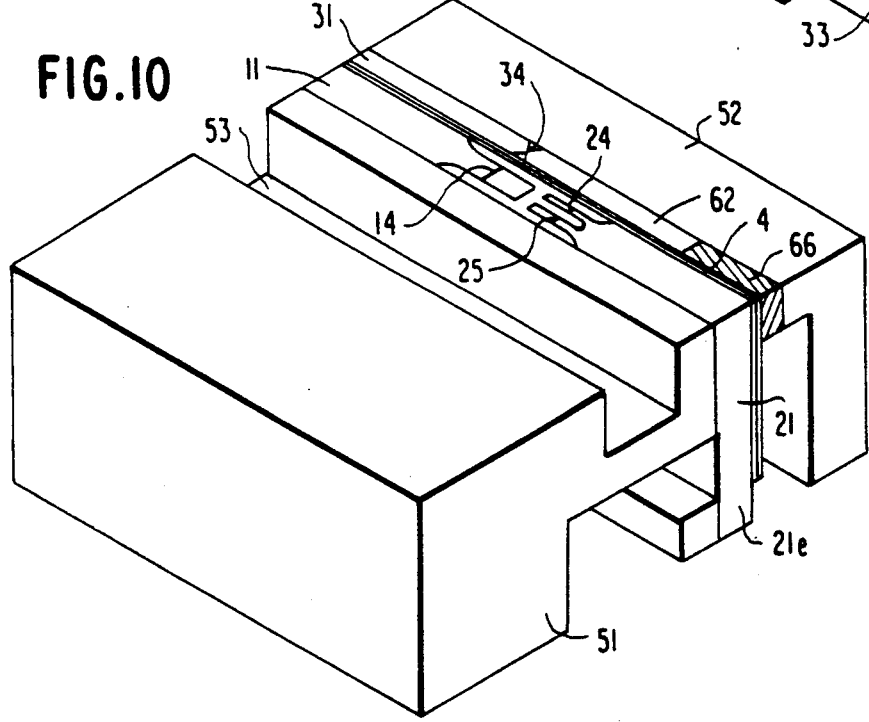
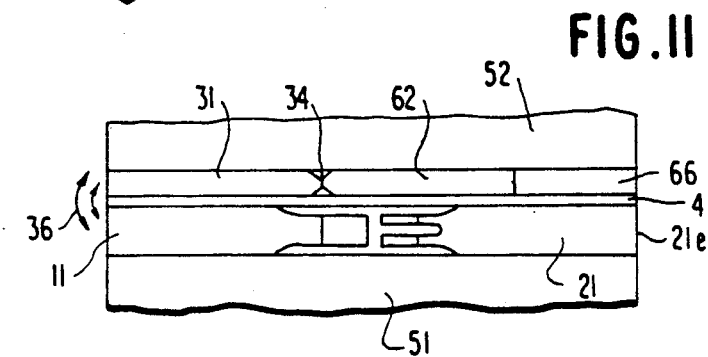

DUAL MAGNETIC HEAD FOR READING AND WRITING INFORMATION AT HIGH AND LOW TRACK DENSITY INCLUDING ERASE GAPS HAVING AN UNDULATING SHAPE

BACKGROUND OF THE INVENTION

The present invention relates to a dual magnetic head for reading and writing information from and to a magnetic recording medium in a high track density mode and a low track density mode.

A conventional magnetic head is disclosed in Japanese Patent Laid-Open No. 28913/1987. The head has a high TPI (Track Per Inch) core and a low TPI core having a high TPI read/write (R/W) gap and a low TPI R/W gap, respectively. The two cores are attached with each other and arranged in the radial direction of a floppy disk. The high TPI gap has a gap width smaller than that of the low TPI gap. A pair of erase gaps provided on an erase core are located at opposite sides of the low TPI gap in order to form guard bands on a floppy disk at opposite sides of a low TPI track.

The drawback with the conventional dual magnetic head is as follows. Assume that the high TPI core is used to read signals from a target track, i.e., a high TPI track recorded at high TPI. Since the erase core assigned to low TPI recording slides on tracks other than the target track, the erase gaps sense the magnetizations of those tracks to generate unnecessary magnetic flux in the erase core. The unnecessary magnetic flux leaks to the high TPI core and thereby deforms the waveform of magnetic flux which is developed in the high TPI core and representative of the magnetization of the target track. As a result, noise is introduced into the output signal of the high TPI core.

SUMMARY OF THE INVENTION

It is therefore an object of the present invention to provide a dual magnetic head capable of reducing unnecessary magnetic flux developed in erase cores which is adapted for low TPI recording in the event of reading information from a magnetic recording medium recorded at high TPI.

It is another object of the present invention to provide a dual magnetic head which minimizes leakage magnetic flux generated in a high TPI R/W core and leaked to a low TPI core.

A dual magnetic head of the present invention has a first read/write (R/W) core having a first R/W gap having a first gap width, and extending in a track direction in which tracks will be formed on a magnetic recording medium. A second R/W core has a second R/W gap having a second gap width greater than the first gap width, and juxtaposed to the first R/W core in a perpendicular direction substantially perpendicular to the track direction. An erase core has a pair of erase gaps located at opposite ends of the second R/W gap with respect to the perpendicular direction. The erase core is juxtaposed to the first R/W core in the perpendicular direction and juxtaposed to the second R/W core in the track direction. At least one of facing surfaces of the erase core which define the erase gaps therebetween is provided with an undulation.

BRIEF DESCRIPTION OF THE DRAWINGS

The above and other objects, features and advantages of the present invention will become more apparent from the following detailed description taken with the accompanying drawings in which:

FIG. 8 is a plan view showing magnetic flux generated in the first embodiment;

FIG. 9 is a perspective view of a high TPI core assembly representative of a second embodiment of the present invention;

FIG. 10 is a perspective view of a head slider assembly employing the second embodiment shown in FIG. 9;

FIG. 11 is a plan view showing magnetic flux generated in the second embodiment shown in FIG. 9;

DESCRIPTION OF THE PREFERRED EMBODIMENTS

Figure 1:
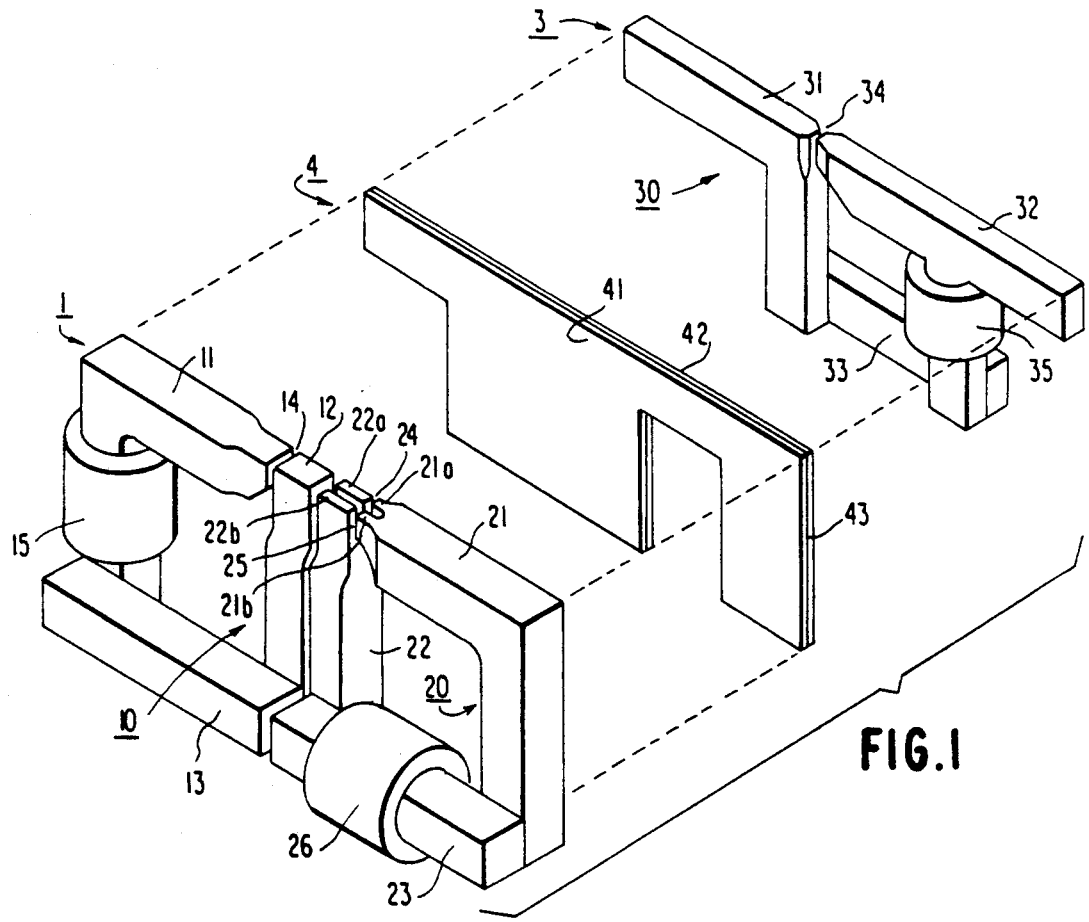
FIGS. 1 and 2 are exploded perspective views showing a dual magnetic head according to a first embodiment of the present invention.
Figure 2:
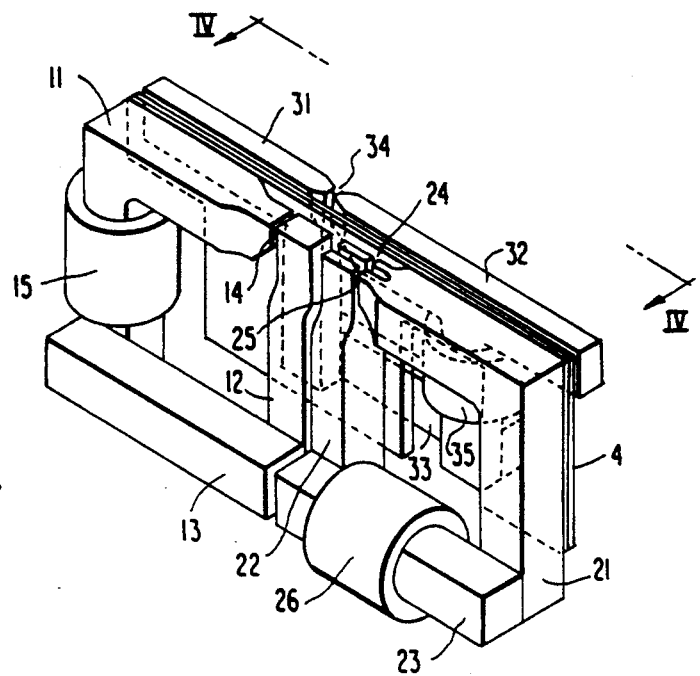

Referring to FIGS. 1 and 2, a dual magnetic head embodying the present invention has a low TPI core assembly 1, a high TPI core assembly 3, and a magnetic shield plate 4 interposed between the core assemblies 1 and 3. The low TPI core assembly 1 has a low TPI read/write (R/W) core 10 made of a magnetic material (Mn-Zn ferrite) and including a leg portion 11, a straight portion 12, and a back bar portion 13. The assembly 1 also has a low TPI erase core 20 made of a magnetic material (Mn-Zn ferrite) and including a leg portion 21, a straight portion 22, and a back bar portion 23.

The leg portion 11, straight portion 12 and back bar portion 13 constitute a magnetic circuit. The leg portion 11 and the straight portion 12 define therebetween a low TPI R/W gap 14 which has a gap width of about 130 μm and a gap length of about 1 μm. A coil 15 is wound around the leg 11 for generating magnetic flux in the R/W core 10 in a low TPI record mode or for sensing magnetic flux generated in the core 10 in a low TPI read mode.

In the erase core 20, each of the leg portion 21 and straight portion 22 is bifurcated at the end thereof. Specifically, the leg portion 21 has bifurcate ends 21a and 21b, and the straight portion 22 has bifurcate ends 22a and 22b. The leg portion 21, straight portion 22 and back bar portion 23 constitute a magnetic circuit. Erase gaps 24 and 25 each has a gap width of about 67 μm and a gap length of 2 to 3 μm are defined between the ends 21a and 22a and between the ends 21b and 22b, respectively. A coil 26 is wound around the back bar portion 23 for generating magnetic flux in the erase core 20 in the low TPI recording. The cores 10 and 20 are connected to each other by epoxy resin at their straight portions 12 and 22.

The high TPI core assembly 3 has a high TPI core 30 made of a magnetic material (Mn-Ze ferrite) and including a generally L-shaped portion 31, a generally T-shaped portion 32, and a back bar portion 33 which in combination constitute a magnetic circuit. The adjoining portions of the L-shaped and T-shaped portions 31 and 32 each is tapered to form a high TPI R/W gap 34 which has a gap width of about 47 $\mu$m and a gap length of about 0.4 $\mu$m. A coil 35 is wound around the T-shaped portion 32 to generate magnetic flux in the core 30 in a high TPI record mode or to sense magnetic flux generated in the core 30 in a high TPI read mode. In the illustrative embodiment, the high TPI gap 34 is brought to a target track by a closed-loop control such as a sector servo control or similar conventional control well known in the art and, therefore, a positioning error from the target track is small. For this reason, the high TPI core assembly 3 is not provided with any erase gap for forming a guard band.

The magnetic shield plate 4 has non-magnetic ceramic plates 41 and 42 and a magnetic film 43 interposed between the ceramic plates 41 and 42.

As shown in FIG. 2, the core assemblies 1 and 3 and shield plate 4 are secured by epoxy resin such that the low TPI R/W gap 14 and high TPI R/W gap 34 align with each other on a line. The gaps 14, 24, 25 and 34 are filled with glass.

Figure 3:
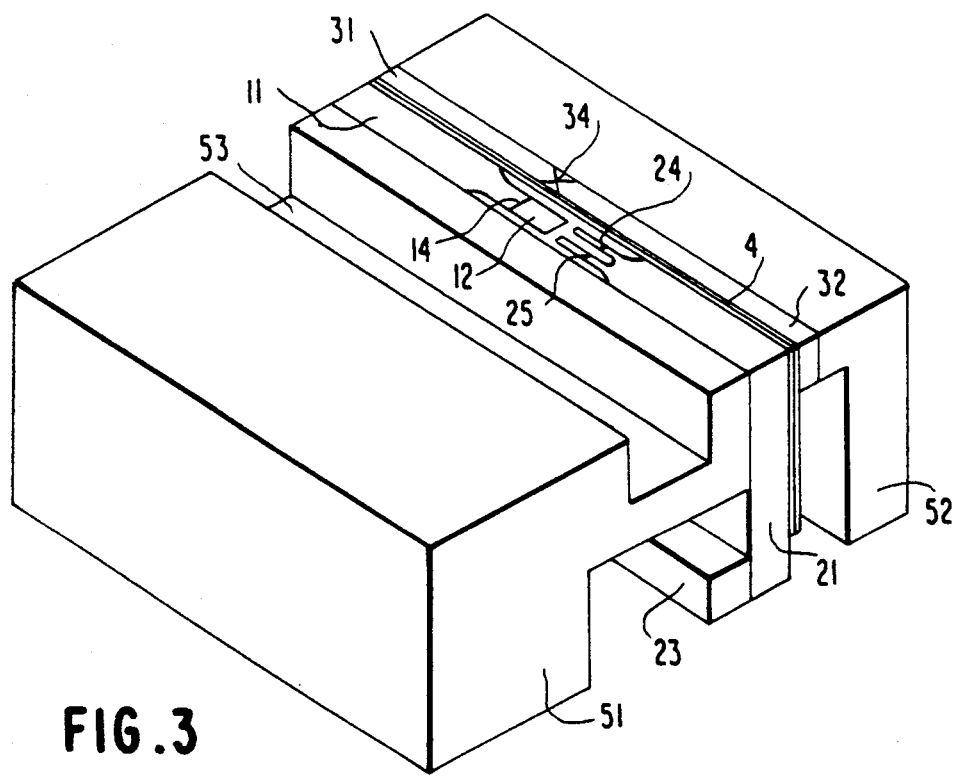
FIG. 3 is a perspective view of a head slider assembly employing the first embodiment shown in FIGS. 1 and 2.

Referring to FIG. 3, a first and a second generally L-shaped sliders 51 and 52 are made of calsium titanate (CaTiO$_3$) which is a non-magnetic material and are adhered to the subassembly shown in FIG. 2, whereby a head slider assembly employing the dual magnetic head is completed. The slider 51 has a groove 53 extending in a direction in which tracks of a magnetic recording medium will extend when the medium faces the slider 51, i.e., in the relative direction of movement of the medium.

In a reading and writing operation on a low TPI (135 TPI) magnetic recording medium such as a floppy disk, the head slider assembly is positioned such that the R/W gap 14 of the low TPI core 10 is positioned on a target track. When a record current associated with data to be recorded and a constant current are caused to flow through the coils 15 and 16, respectively, a low TPI track approximately 117 $\mu$m wide is formed on the medium with substantially 67 $\mu$m wide guard bands holding it therebetween. In the reading operation, changes in the magnetic flux of the low TPI track are sensed on the basis of the current flowing through the coil 15.

In reading and writing operation on a high TPI (431 TPI) recording medium, the R/W gap 34 of the high TPI core 30 is positioned on a target track. When a record current associated with data is caused to flow through the coil 35, a high TPI track approximately 47 $\mu$m wide is formed on the medium. In the reading operation, magnetic flux is generated in the core 30 depending on the magnetization of the high TPI target track. The counter electromotive force current caused by the magnetic flux and flowing through the coil 35 is sensed.

When the high TPI core 30 reads information from the high TPI recording medium, i.e., when the R/W gap 34 is positioned on a target track, the R/W gap 14 and erase gaps 24 and 25 of the low TPI core assembly 1 are located at several other high TPI tracks adjoining the target track. In this condition, the R/W gap 34 and erase gaps 24 and 25 are apt to pick up magnetizations recorded in such other high TPI tracks and thereby generate unnecessary magnetic flux in the associated cores 10 and 20. Since each of the low TPI gap 14 and erase gaps 24 and 25 has a greater width than the high TPI gap 34, it is likely that the unnecessary magnetic flux developed in the cores 10 and 20 is substantial and not negligible.

Figure 4:
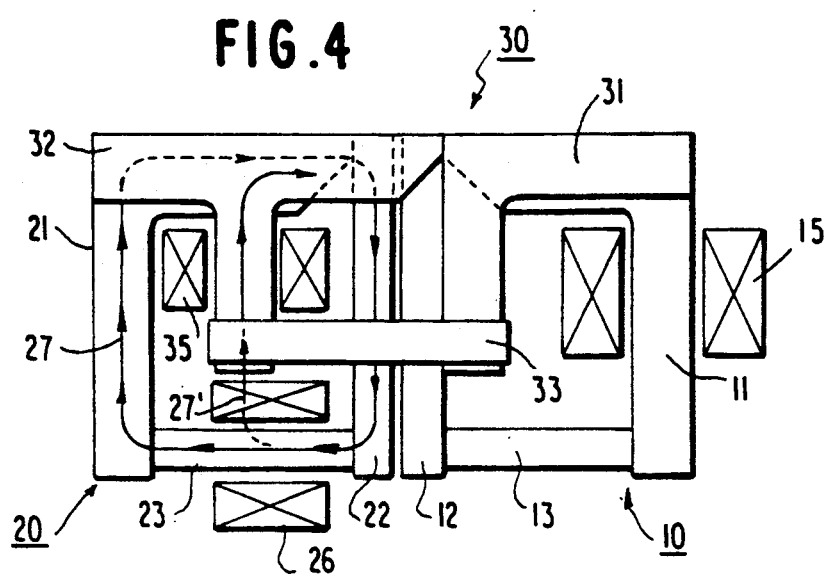
FIG. 4 is an elevation view taken in a direction IV—IV of FIG. 2, showing magnetic flux generated in the first embodiment.

Referring also to FIG. 4, the coil 35 of the high TPI core assembly 3 is positioned in close proximity to the erase core 20 so that, when unnecessary magnetic flux 27 is developed in the core 20, part of the flux 27 extends through the coil 35 as leakage flux 27'. This leakage flux 27' would induce a counter electromotive force in the coil 35 and superpose it on a current which is induced by the flux generated by magnetization of the target track in the high TPI core 30. As a result, the waveform of a read current to be outputted by the coil 35 would be deformed, i.e., noise would be generated in the coil 35 by the leakage flux 27'.

Figure 5:
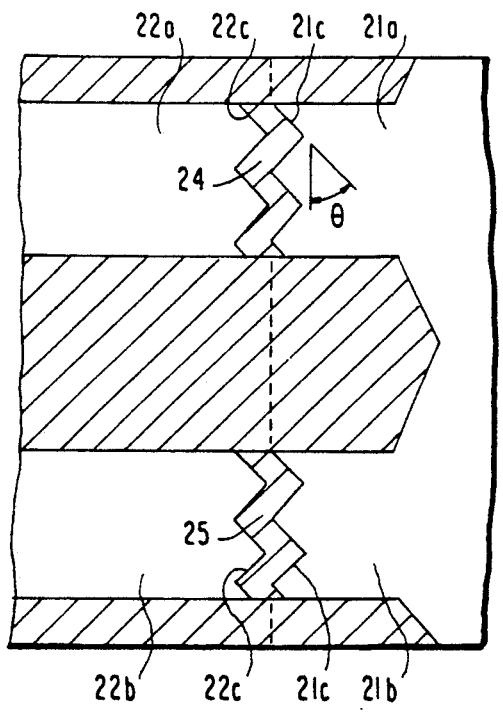
FIGS. 5 through 7 are plan views showing an erase core included in the first embodiment.

FIG. 5 shows a specific implementation which the illustrative embodiment has for reducing the unnecessary magnetic flux 27 which is apt to appear in the erase core 20 as stated above. As shown, the ends 21a and 22a defining the erase gap 24 and ends 21b and 22b defining the erase gap 25 are provided with undulations 21c and 22c at their opposing surfaces. The undulations 21c and 22c are formed by etching, and each has a sharp saw-tooth-like section. The undulations 21c and 22c are configured such that projections and recesses substantially face each other. The undulations are inclined relative to the high TPI gap 34 by an angle $\theta$ which is sufficient for guard bands to be formed in the low TPI recording and which prevents the magnetizations of high TPI tracks from being picked up in the high TPI recording and reading. A preferable range of the angle $\theta$ is 30 degrees to 60 degrees. In this configuration, when the erase gaps 24 and 25 move above high TPI data tracks or servo patterns on the high TPI medium, they have a substantial angle relative to the line of magnetization reversal on the medium and, as a result, an azimuth loss (angle loss) contributes to reduce unnecessary flux 27 to be induced in the erase core 20. It follows that even when the high TPI core 30 or the coil 35 neighbors the erase core 20, the flux leaking from the core 20 has little influence on the core 30 or the coil 35. Consequently, noise superposed on the coil 35 is reduced.

Figure 6:
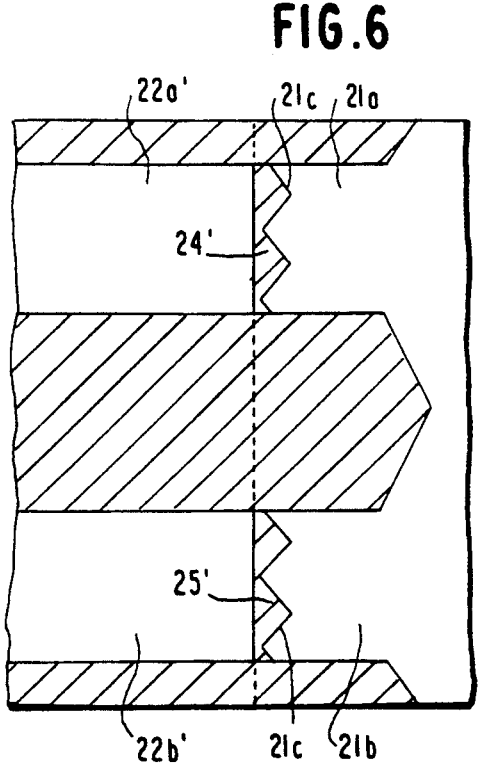

FIG. 6 shows an alternative implementation having modified erase gaps 24' and 25'. While the leading ends 21a and 21b shown in FIG. 6 are identical in configuration as those shown in FIG. 5, the straight portion 22 has ends 22a' and 22b' which are simply flat and not undulated.

Figure 7:
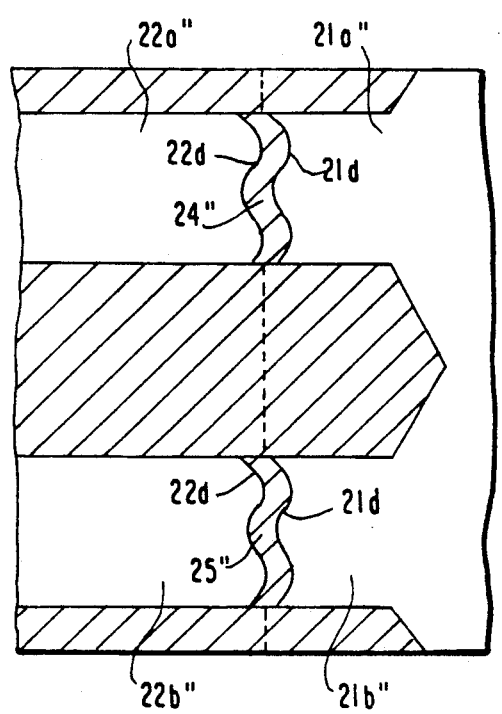

FIG. 7 shows another alternative implementation having modified erase gaps 24" and 25". As shown, ends 21a", 21b", 22a" and 22b" are provided with undulations 21d and 22d each having a curved waveform-like section. Again, the projections and recesses of the undulations 21d and 22d substantially face each other.

Regarding the advantages, the alternative configurations shown in FIGS. 6 and 7 are comparable with the configuration of FIG. 5 since the erase gaps 24' and 25' and the erase gaps 24" and 25" are not parallel to the high TPI gap 34.

While the dual magnetic head having the above construction is successful in reducing the unnecessary flux 27 developed in the erase core 20 to a negligible degree, it experiences a problem left unsolved, as follows. Specifically, assume that high TPI recording is effected by use of the high TPI core assembly 3 as shown in FIG. 8, i.e., a record current is caused to flow through the coil 35 to generate sufficient recording flux in the high TPI core 30. Then, the flux leaks from the side edges of the core 30 to the low TPI core assembly 1 over the edges of the magnetic shield plate 4, thereby constituting a magnetic circuit. This leakage flux 36 reduces the intensity of the recording magnetic field developed in the high TPI gap 34. Therefore, the above-stated magnetic head cannot always transform the record current flowing through the coil 35 efficiently into a recording magnetic field in the R/W gap 34.

Alternative embodiments which will be described are free from the drawback stated above.

Referring to FIG. 9, a high TPI core assembly 6 representative of a second embodiment of the present invention includes a generally L-shaped core 62. The core 62 is formed by removing one end of the T-shaped core 32 of FIG. 1, that faces the magnetic medium. The core assembly 6 is 30% shorter than the core assembly 3 of FIG. 1, as measured in the direction in which tracks extend (longitudinal direction). The rest of the construction is the same as the previous embodiment.

As shown in FIG. 10, a head slider assembly has a spacer 66 made of non-magnetic ceramic and affixed to the removed portion of the L-shaped core 62 shown in FIG. 9. The rest of the construction is the same as the embodiment described with reference to FIG. 3.

As shown in FIG. 11, the non-magnetic spacer 66 covers the end of the magnetic L-shaped core 62 and thereby isolates it from the outside. Hence, such an end of the core 62 is prevented from magnetically coupling with an end 21e of the leg portion 21 of the erase core 20. Consequently, among the flux developed in the core 62 by a record current flowing through the coil 35, the flux leaking to the leg 21 is reduced, whereby efficient conversion of the record current into a magnetic field in the R/W gap 34 is promoted.

This particular embodiment is easy to fabricate since the R/W gaps 14 and 34 of the low TPI and high TPI core assemblies 1 and 6, respectively, can be positioned on a line only by aligning the left ends (in FIG. 11) of the assemblies 1 and 6.

The overwriting characteristic available with the high TPI core assembly 6 shown in FIGS. 9 and 10 were determined by experiments, as follows. Twenty magnetic heads implemented with the first embodiment and twenty magnetic heads implemented with the second embodiment were fabricated. The overwriting characteristics of the two groups of magnetic heads were measured and then averaged. For the measurement, new data was written over previously recorded old data, and then the remaining amount of old data was determined in terms of decibels. The experiments showed that the overwritting characteristic of the high TPI core assembly 3 with the low TPI core assembly 1 using the first embodiment is −25 dB, while the overwriting characteristic of the high TPI core assembly 6 with the low TPI core assembly 1 using the second embodiment is −34 dB. For comparison, a magnetic head having only the high TPI core assembly 3 or 6, i.e., without the low TPI core assembly 1 (i.e., an exclusive high TPI head) was measured to have an overwriting characteristic of −36 dB. With the second embodiment, therefore, it is possible to achieve an overwriting characteristic comparable with that of the exclusive high TPI head.

Figure 12:
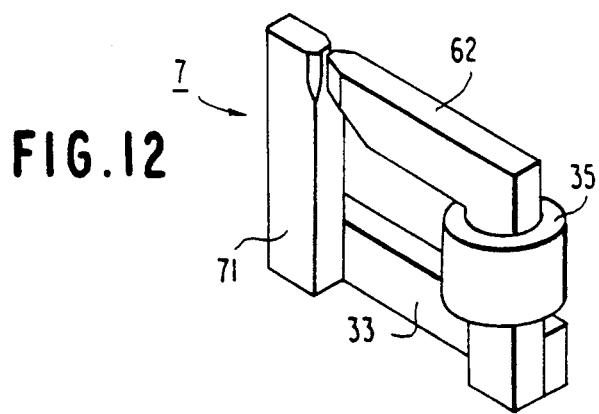
FIG. 12 is a perspective view of a high TPI core assembly representative of a third embodiment of the present invention.

FIG. 12 shows a high TPI core assembly 7 representative of a third embodiment of the present invention. As shown, the core assembly 7 has a core 71 having a generally I-shaped configuration and produced by removing one end of the L-shaped core 31 of FIG. 9, that faces the medium. The rest of the configuration is the same as the previously stated second embodiment, shown in FIG. 9.

Figure 13:
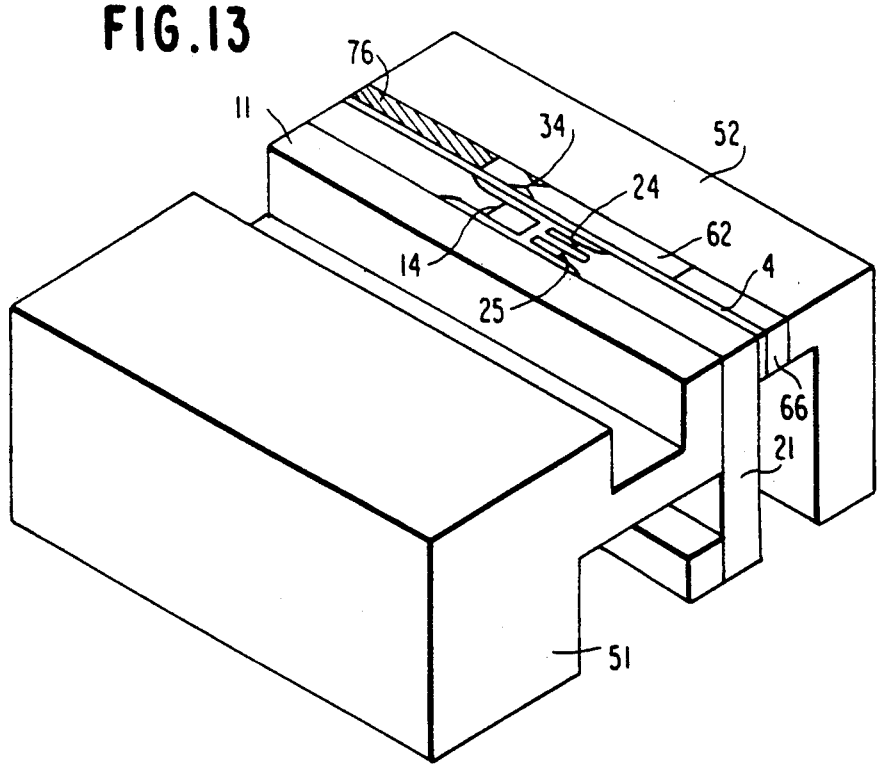
FIG. 13 is a perspective view of a head slider assembly employing the third embodiment shown in FIG. 12.

As shown in FIG. 13, a spacer 76 made of ceramic is affixed to the removed portion of the I-shaped core 71. The rest of the construction is the same as the embodiment of FIG. 10

Figure 14:
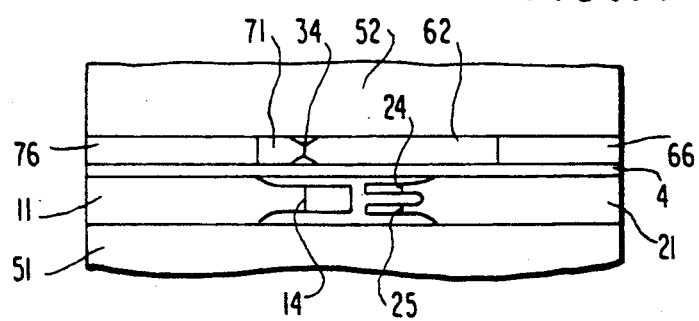
FIG. 14 is a plan view showing magnetic flux generated in the third embodiment shown in FIG. 12.

As FIG. 14 indicates, the non-magnetic spacer 76 physically covers the end of the magnetic I-shaped core 71 and thereby prevents it from magnetically coupling with the end of the leg portion 11 of the R/W core 10. This reduces, among the flux generated in the core 71 by a record current flowing through the coil 35, the flux leaking to the leg 11, thereby enhancing even more efficient conversion of the record current into a magnetic field in the R/W gap 34.

We claim:

1. A dual magnetic head comprising:
a first read/write core including a first read/write gap having a first gap width, and extending in a first direction which is a direction in which tracks to be formed on a magnetic recording medium extend;
a second read/write core including a second read/write gap having a second gap width greater than said first gap width, and juxtaposed to said first read/write core in a second direction substantially perpendicular to said first direction;
magnetic shield means provided between said first read/write core and said second read/write core; and
an erase core having a pair of erase gaps located at opposite ends of said second read/write gap with respect to said second direction, said erase core being juxtaposed to said first read/write core in said second direction and juxtaposed to said second read/write core in said first direction, at least one of facing surfaces of said erase core, which define said erase gaps therebetween, being provided with an undulating shape, wherein said first read/write core has a length less than a total length of said second read/write core and said erase core, as measured in said first direction.

2. A magnetic head as claimed in claim 1, wherein said second gap is substantially aligned with said first gap in said second direction.

3. A magnetic head as claimed in claim 1, wherein said second read/write core and said erase core form a low TPI core assembly, said magnetic shield means intervening between said first read/write core and said low TPI core assembly.

4. A magnetic head as claimed in claim 1, wherein said undulating shape includes a sawtooth-like shape on a surface facing said magnetic recording medium.

5. The magnetic head of claim 4 wherein both of said surfaces are provided with undulations, said undulations having a saw tooth section, projections and recesses of said saw tooth section respectively opposing one another.

6. A magnetic head as claimed in claim 1, wherein said undulating shape includes a waveform-like shape on a surface facing said magnetic recording medium.

7. The magnetic head of claim 6 wherein both of said facing surfaces have waveform-like undulations, projections and recesses of said undulations respectively opposing one another.

8. The magnetic head of claim 1 wherein both of said facing surfaces are provided with undulations.

9. The magnetic head of claim 1 wherein said undulations are inclined a predetermined angle relative to said track direction in which said first gap extends.

10. The magnetic head of claim 9 wherein said predetermined angle is in the range of 30° to 60°.

11. The magnetic head of claim 1 wherein said first read/write core includes an L-shaped portion, a T-shaped portion and a back bar portion connected to said L-shaped portion and said T-shaped portion; said first gap being defined by opposing surfaces of said L-shaped and T-shaped portions.

12. The magnetic head of claim 1 wherein said first read/write core include two L-shaped portions and a back bar portion interconnecting said L-shaped portions, said first gap being defined by opposing surfaces of said two L-shaped portions.

13. The magnetic head of claim 12, wherein one of said L-shaped portions includes a non-magnetic spacer disposed adjacent thereto.

14. The magnetic head of claim 13, wherein said non-magnetic spacer covers an end of said one L-shaped core to isolate it.

15. The magnetic head of claim 1, wherein said first read/write core includes an I-shaped portion, an L-shaped portion, and a back bar portion connected to said I-shaped and L-shaped portions, said first gap being defined by opposing surfaces of said I-shaped and L-shaped portions.

16. The magnetic head of claim 15, wherein a non-magnetic spacer is affixed to an end of said I-shaped portions so as to thereby prevent it from magnetically coupling with an end of said second read/write core.

17. A magnetic head as claimed in claim 1, wherein said second read/write gap is substantially aligned with said first read/write gap in said second direction.

18. A magnetic head as claimed in claim 1, wherein said second read/write core and said erase core form a low TPI core assembly, said magnetic shield means intervening between said first read/write core and said low TPI core assembly.

19. A magnetic head as claimed in claim 1, further comprising a spacer made of non-magnetic material and attached at one end of said first read/write core in said first direction.

20. A magnetic head as claimed in claim 1, further comprising spacers made of non-magnetic material and attached both end of said first read/write core in said first direction.

21. A dual magnetic head comprising:
a first read/write core having a first read/write gap having a first gap width, and extending in a first direction which is a direction of tracks to be formed on a magnetic recording medium;
a second read/write core having a second read/write gap having a second gap width greater than said first gap width, and juxtaposed to said first read/write core in a second direction approximately perpendicular to said first direction;
a magnetic shield means provided between said first read/write core and said second read/write core; and
an erase core having a pair of erase gaps located at opposite ends of said second read/write gap with respect to said second direction, said erase core being juxtaposed to said first read/write core in said second direction and juxtaposed to said read/write core in said first direction;
wherein said first read/write core has a length less than a total length of said read/write core and said erase core, as measured in said first direction.

* * * * *